UNITED STATES PATENT OFFICE.

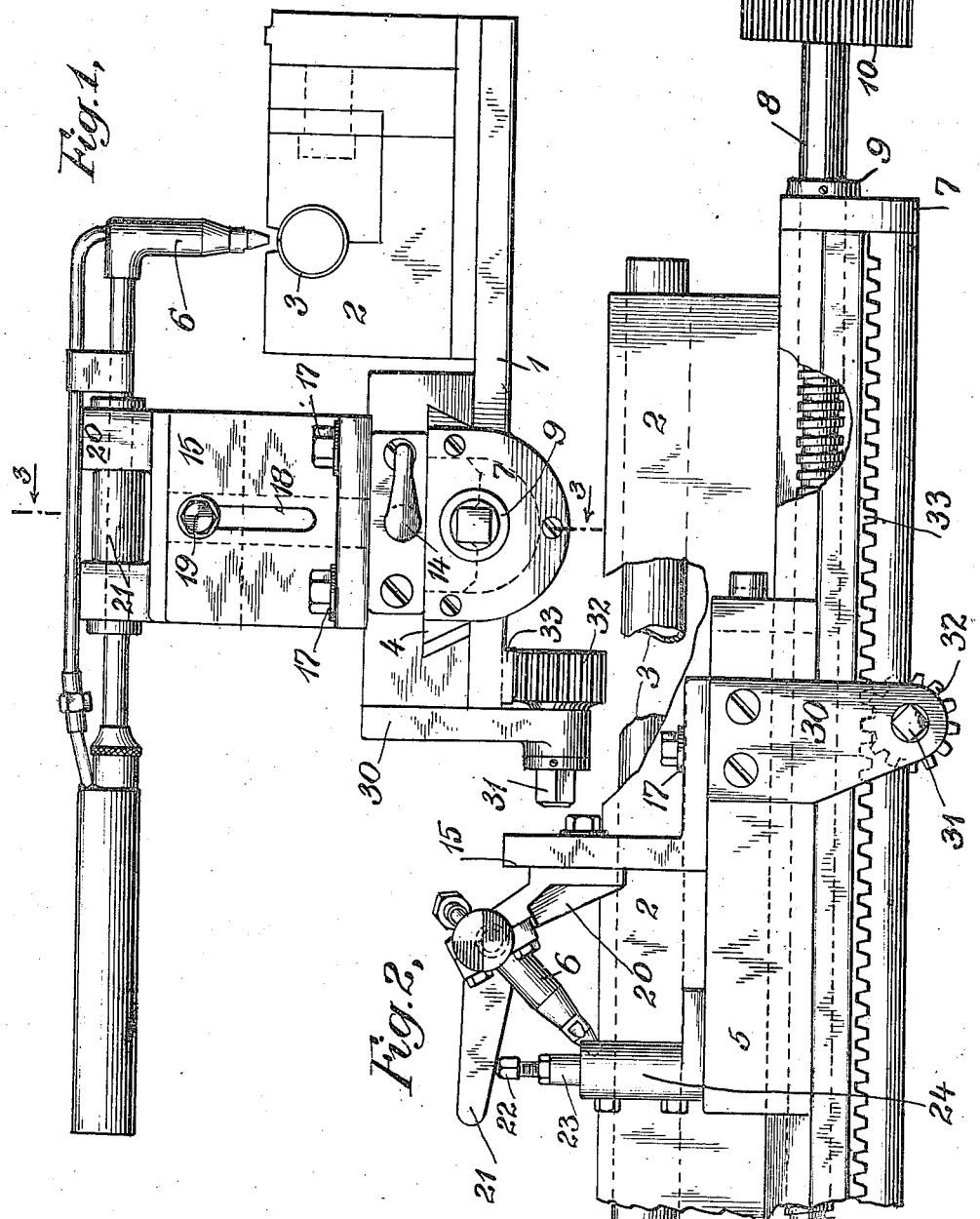

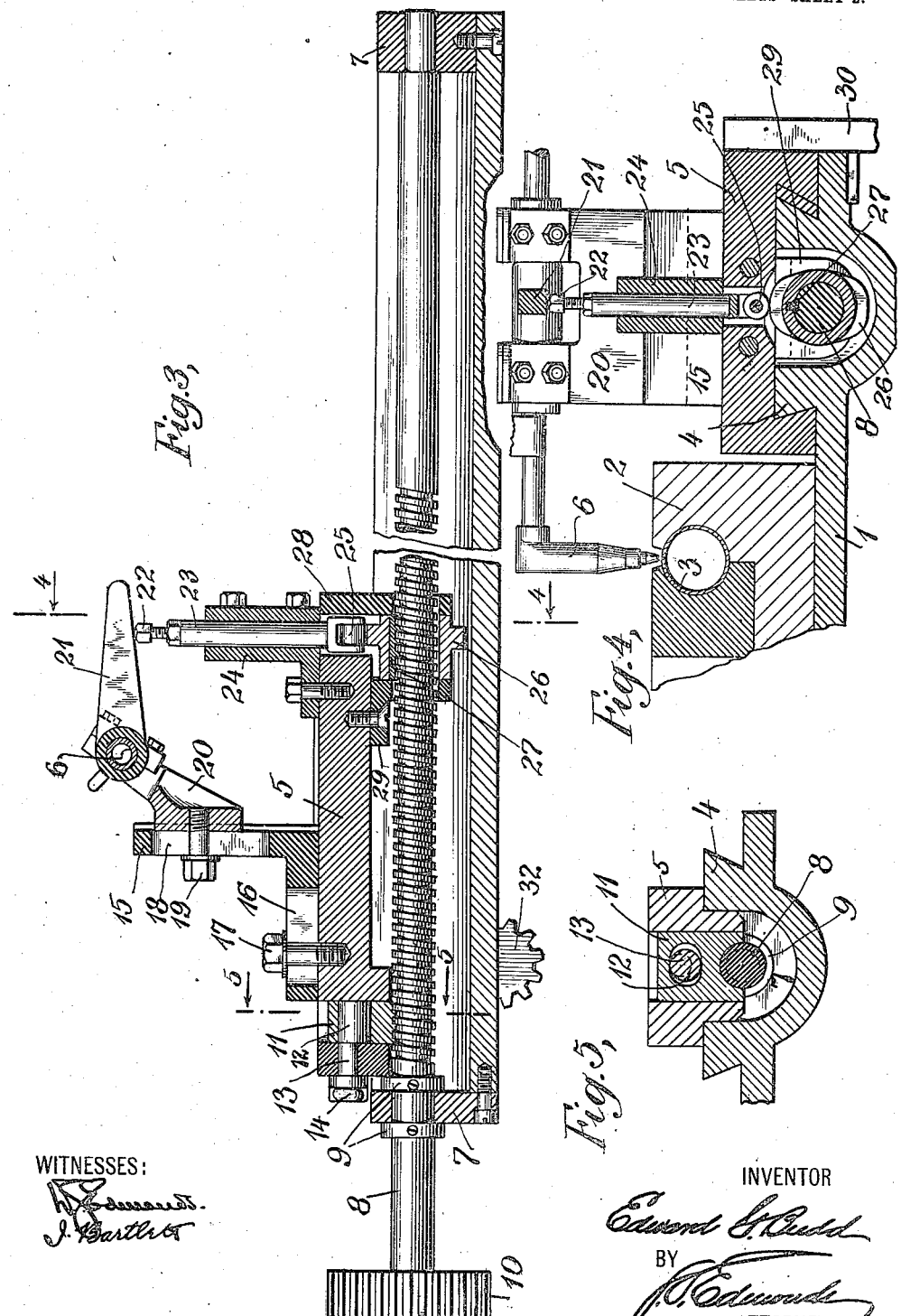

EDWARD G. BUDD, OF PHILADELPHIA, PENNSYLVANIA, ASSIGNOR TO HALE-KILBURN METAL COMPANY, OF PHILADELPHIA, PENNSYLVANIA, A CORPORATION OF PENNSYLVANIA.

WELDING APPARATUS.

948,965.  Specification of Letters Patent.  Patented Feb. 8, 1910.

Application filed December 21, 1907. Serial No. 407,586.

*To all whom it may concern:*

Be it known that I, EDWARD G. BUDD, a citizen of the United States, residing at Philadelphia, in the county of Philadelphia and State of Pennsylvania, have invented certain new and useful Improvements in Welding Apparatus, of which the following is a specification.

This invention relates to apparatus for welding and has reference, more particularly, to apparatus for this purpose employing a blow-pipe burner for reducing the metal of the parts to be welded. Preferably, the type of burner employed is an oxygen acetylene blow-pipe with which a very high heat may readily be obtained.

The object of the invention is to provide an improved apparatus for welding, employing such a blow-pipe burner with which the operation of welding may be quickly and readily performed, at small expense of time and labor.

In accordance with the invention, a suitable support for the parts to be welded is provided and a burner is mounted in position to play on the edges of these parts which are to be united. Provision is made for adjustment of the burner both as to its angular relation and as to its distance from the parts to be welded, in order that the best working position of the burner may always be obtained. In order to make the apparatus automatic in its action, means are employed for moving the burner and the support for the parts to be welded relatively during the welding operation so that the flame from the burner travels along the line of the weld. Thus it is only necessary to properly adjust the parts, turn on the flame and start the devices for effecting the relative movement of the parts and burner, after which the travel of the flame along the line of the weld and the uniting of the parts will take place without further attention. The apparatus is of special utility when used with an oxygen acetylene burner, as the flame from such a burner will reduce the metal of the parts to be united to the melting point very quickly. When the metal at any particular point along the line of the weld has been reduced to the melting point, the flame should be quickly removed to allow the metal to set before it flows away; I therefore mount the burner so that it can be moved intermittently to carry the flame away from the welding point, the burner being preferably pivotally mounted and a device being provided for rocking it on its pivot. This movement of the burner is preferably such that the flame is moved along the line of the weld so that while the metal at the welding point is setting, the flame is heating the metal at a point slightly in advance of the welding point so as to raise its temperature preparatory to the welding which is to follow.

The preferred embodiment of my invention is illustrated in the accompanying drawings, in which—

Figure 1 is an end view of the apparatus, Fig. 2 is an elevation of the same broken away in part, Fig. 3 is a section on the line 3—3 of Fig. 1, Fig. 4 is a section on the line 4—4 of Fig. 3 and Fig. 5 is a section on the line 5—5 of Fig. 3.

Referring to these drawings, 1 indicates a bed on which is mounted a suitable support 2 for the parts to be welded together. In the drawings I have shown the support 2 as arranged to hold a blank 3 which has been curled to tubular form in position for welding together the edges of the blank to form a seamless tube. It is to be noted, however, that the invention is in no way limited as to the use to which the apparatus is put, and that various other devices may be welded together with the apparatus by merely changing the construction of the devices for supporting them upon the bed 1. On the upper face of bed 1 is a guide 4 which is received in correspondingly shaped recesses in a support 5 on which the burner 6 is mounted. At the ends of the bed 1, bearings 7 are provided in which a shaft 8 is mounted for rotation, this shaft being provided with collars 9 secured to the shaft one on either side of one of the bearings 7 to preclude axial movement of the shaft. A gear 10 is keyed on the end of shaft 8 and is engaged by suitable power driven devices to cause rotation of the shaft in its bearings. Between the bearings 7, shaft 8 is threaded, as shown, and the relative movement of the burner and the support for the parts to be welded, is effected by the threaded shaft 8. For this purpose a half nut is formed upon a block 11 carried by the support 5, this nut engaging the threads on shaft 8. In order to permit rapid relative movement of the burner and support after the welding operation has been completed, the block 11 is made movable relatively to support 5. A vertical opening is formed in the support to receive block 11 and the block is provided with an opening as shown in Fig. 5 to receive an eccentric 12 formed upon the end of a pin 13 which extends through an opening in support 5 and has an operating handle 14 secured upon its end. As shown in Fig. 3, the nut is in engagement with the threads of shaft 8 and rotation of the shaft will cause a corresponding movement of support 5 upon bed 1; by turning the handle 14 through a half revolution, the eccentric 12 will raise block 11 in the opening in support 5 to carry the half nut on the block out of engagement with the threads on shaft 8 so that support 5 may be moved freely in either direction.

The burner 6 is supported by a bracket 15 which may be adjusted relatively to support 5 in a direction parallel to the axis of shaft 8 and then locked in any desired position. For this purpose bracket 15 is provided with a slot 16 to receive a screw 17, the end of which is adapted to enter a threaded opening in support 5. The vertically-disposed portion of bracket 15 is also provided with a slot 18 adapted to receive a screw 19, the threaded end of which enters a threaded opening in an arm 20. The burner 6, which may be of any suitable construction, is mounted in an opening in the outer end of arm 20 so that it may be rocked in this opening on an axis perpendicular to the axis of shaft 8. Secured to the burner is an arm 21 the outer end of which bears upon a stud 22 vertically adjustable in the end of a rod 23. This rod is adapted to reciprocate in an opening formed in a bracket 24 secured upon the bed 5 and at its lower end carries a roller 25 which bears upon the periphery of a cam 26. This cam has an opening formed therein through which the shaft 8 extends loosely but the cam is made to rotate with shaft 8 by means of a spline 27 (Figs. 3 and 4) which enters a keyway running lengthwise of shaft 8 and a keyway formed on the interior of the opening through the cam 26. Cam 26 and spline 27 are held in the proper relation to the roller 25 throughout the relative movements of the burner support and bed by guides 28 and 29 depending from bed 5, one on either side of the cam and spline.

Depending from the support 5 at the rear thereof is an arm 30 carrying at its lower end a short shaft, one end 31 of which is squared to receive a suitable operating handle, and the other end of which carries a pinion 32 which meshes with a rack 33 formed on the bottom of the bed 1.

The operation of the apparatus will now be described. The parts to be welded together are mounted upon the bed 1 in any suitable manner with the line along which the weld is to be made running parallel to the axis of shaft 8. The burner is then so positioned that the flame issuing therefrom will be directed downwardly upon the parts to be united along this line. Any desired adjustment of the angular position of the burner and the distance between it and the parts to be united can readily be secured by means of the screws 17, 19 and 22. With the block 11 raised out of engagement with the screw on shaft 8, the support 5 is moved by means of a handle applied to the squared end 31 of the shaft carrying the pinion 32 until the burner is in position to play upon the parts to be united at the beginning of the line of the weld. Handle 14 is then turned to carry the half-nut on block 11 into engagement with the threads of shaft 8, the burner is turned on and power is applied to the gear 10 to rotate shaft 8. As the shaft rotates the threads thereon coact with those of the half-nut on block 11 to move the parts to be united and the burner relatively and thus cause the burner to travel along the line of the weld. The high heat of the flame from the burner quickly reduces the metal of the parts at the welding point. As shaft 8 rotates, the cam 26 rotates with it and as each of the raised portions thereon come under the roller 25 the latter with rod 23 and screw 22 are raised and coact with the arm 21 to rock the burner in its pivoted support. This operates to move the flame from the welding point while the metal at this point is setting and the movement of the burner is such that during this period the flame is playing upon the metal of the parts to be united on the line of the weld and slightly in advance of the welding point so that the metal at that point is heated somewhat, enabling the weld at that point to be made more quickly when the relative movement of the burner and support has progressed somewhat. The flame thus travels the length of the line of the weld, reducing the metal at the edges of the parts to be united until it flows and being rocked on its pivotal support intermittently so that the flame is raised momentarily from the welding point while the metal at that point is setting, and while so raised the metal in advance of the welding point is being pre-heated.

In the drawings I have shown the cam 26 as provided with two raised portions but any desired variation in this respect may be made depending upon the speed at which the machine is to be run, the thickness of the metal of the parts to be united and various other considerations.

It will be seen that with the apparatus here disclosed the operation is automatic so that if the line of the weld is of considerable length the operator's attention is required during but a small portion of the welding operation. The work of welding may therefore be performed quickly and at small expense.

Having described my invention, what I claim as new and desire to secure by Letters Patent of the United States is:

1. Welding apparatus comprising a support for the parts to be welded, a burner for applying heat to said parts, means for effecting a relative movement of said support and burner to cause the flame from the burner to travel along the line of the weld, and means for automatically moving the burner intermittently during said relative movement of the support and burner to intermittently remove the flame from the welding point, substantially as described.

2. Welding apparatus comprising a support for the parts to be welded, a burner for applying heat to said parts, means for effecting a relative movement of said support and burner to cause the flame from the burner to travel along the line of the weld, and means for automatically moving said burner in the direction of the line of the weld intermittently during such relative movement of the support and burner to cause the flame from the burner to act intermittently on said parts at a point in the line of the weld in advance of the welding point, substantially as described.

3. Welding apparatus comprising a support for the parts to be welded, heating devices for applying heat to said parts, means for effecting a relative movement of said support and heating devices to cause the latter to travel along the line of the weld, and means for giving to said heating devices a reciprocatory movement in the direction of the line of the weld during said relative movement of the support and heating devices, substantially as described.

4. Welding apparatus comprising a support for the parts to be welded, a burner for directing a flame against said parts, means for adjusting said burner relatively to said parts, means for effecting a relative movement of said support and burner to cause the flame to travel along the line of the weld, and means for reciprocating said burner during said relative movements of the burner and support, substantially as described.

5. Welding apparatus comprising a support for the parts to be welded, a pivotally mounted burner, and means for simultaneously rocking said burner on its pivot intermittently and moving said burner and support relatively to cause the flame from the burner to travel along the line of the weld, substantially as described.

6. Welding apparatus comprising a support for the parts to be welded, a burner for directing a flame on said parts, devices for adjusting the angular relation of said burner and the distance between the same and said parts, means for moving the burner and said parts relatively to cause the flame to travel along the line of the weld, and means for intermittently moving said burner during the relative movement of the burner and the parts to be welded to cause the burner to act on said parts at a point in advance of the welding point, substantially as described.

7. Welding apparatus comprising a support for the parts to be welded, a pivotally mounted burner for directing a flame on said parts, a cam, means actuated by said cam for rocking said burner on its pivot, and a single means for operating said cam and moving said support and burner relatively to cause the flame to travel along the line of the weld, substantially as described.

8. Welding apparatus comprising a support for the parts to be welded, a burner for applying heat to said parts, a feed-screw for moving said burner to cause the flame therefrom to travel along the line of the weld, means for disconnecting the burner from the screw, means for returning the burner to initial position, and means for automatically moving said burner intermittently during the movement thereof effected by said feed-screw to intermittently remove the flame from the welding point, substantially as described.

9. Welding apparatus comprising a support for the parts to be welded, a burner for heating the parts, means for adjusting the angular disposition of the burner relatively to said parts and its distance therefrom, means for moving said burner and support relatively to cause the burner to travel along the line of the weld, and means for automatically moving the burner intermittently during said relative movement of the burner and support to automatically remove the flame from the welding point, substantially as described.

10. Welding apparatus comprising a stationary support for the parts to be welded, a pivotally mounted burner for directing a flame on said parts, means for moving said burner to cause the flame thereof to travel along the line of the weld, a cam moving with said burner and actuated in accordance with the movement of the burner, and means actuated by the cam for rocking the burner on its pivot, substantially as described.

11. Welding apparatus comprising a support for the parts to be welded, a burner, a support on which the burner is pivotally mounted, a feed-screw extending in a direction transverse to the pivotal axis of the burner, means for operating said feed-screw, means actuated by said feed-screw to feed said support for the burner, and means for rocking said burner on its pivots during the movement of the burner actuated by the feed-screw, substantially as described.

12. Welding apparatus comprising a support for the parts to be welded, a burner, a support on which the burner is pivotally mounted, a feed-screw extending in a direction transverse to the pivotal axis of the burner, means for operating said feed-screw, means actuated by said feed-screw to feed said support for the burner, a cam splined on said feed-screw and moving with said support for the burner, and means actuated by said cam for rocking the burner, substantially as described.

This specification signed and witnessed this 17th day of December, 1907.

EDWARD G. BUDD.

Witnesses:
 M. GETZ,
 R. M. FRIES.